(12) United States Patent
Huber et al.

(10) Patent No.: US 10,424,419 B2
(45) Date of Patent: Sep. 24, 2019

(54) INSULATION SYSTEM FOR AN ELECTRICAL MACHINE

(71) Applicant: Siemens Aktiengesellschaft, Munich (DE)

(72) Inventors: Jürgen Huber, Erlangen (DE); Dieter Schirm, Breitenguessbach (DE); Matthias Übler, Ursensollen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/556,816

(22) PCT Filed: Mar. 9, 2016

(86) PCT No.: PCT/EP2016/054998
§ 371 (c)(1),
(2) Date: Sep. 8, 2017

(87) PCT Pub. No.: WO2016/146446
PCT Pub. Date: Sep. 22, 2016

(65) Prior Publication Data
US 2018/0053581 A1    Feb. 22, 2018

(30) Foreign Application Priority Data

Mar. 18, 2015   (DE) .................. 10 2015 204 885

(51) Int. Cl.
*H01B 3/00*      (2006.01)
*H01B 3/40*      (2006.01)
(Continued)

(52) U.S. Cl.
CPC .............. *H01B 3/40* (2013.01); *B29C 39/025* (2013.01); *C08G 59/5073* (2013.01); *H01B 3/04* (2013.01);
(Continued)

(58) Field of Classification Search
CPC ... B29C 39/025; B29C 39/123; B29C 39/146; B29C 39/18; B29C 43/203;
(Continued)

(56) References Cited

U.S. PATENT DOCUMENTS 4,336,302 A    6/1982   Ihlein ............................ 428/324
4,340,744 A *  7/1982   Schwarz ............. C07D 233/54
                                                      548/335.1
(Continued)

FOREIGN PATENT DOCUMENTS

CN    1844237 A    10/2006   ............. C08L 63/10
DE    3003477 A1   7/1981    ............. C08G 59/00
(Continued)

OTHER PUBLICATIONS

Ham, Young Rok et al., "A Comparison of Some Imidazoles in the Curing of Epoxy Resin," Journal of Industrial and Engineering Chemistry, vol. 16, No. 4, pp. 556-559, Jan. 13, 2010.
(Continued)

*Primary Examiner* — Binh B Tran
(74) *Attorney, Agent, or Firm* — Slayden Grubert Beard PLLC

(57) ABSTRACT

The present disclosure relates to insulation systems. The teachings thereof may be embodied in an insulation system for an electrical machine. For example, an insulation system may comprise: solid insulation materials; an impregnating resin having oxirane functionalities; a depot accelerator distributed throughout the solid insulation materials; and a catalyst for initiating hardening of the impregnating resin, wherein the catalyst is at least partly in gaseous form under hardening conditions.

12 Claims, 3 Drawing Sheets

(51) Int. Cl.
*B29C 39/02* (2006.01)
*C08G 59/50* (2006.01)
*H01B 3/04* (2006.01)
*H02K 3/30* (2006.01)
*H02K 15/12* (2006.01)
*H01B 17/00* (2006.01)
*B29C 39/12* (2006.01)
*B29C 39/14* (2006.01)
*B29C 39/18* (2006.01)
*B29C 43/18* (2006.01)

(52) U.S. Cl.
CPC .............. *H02K 3/30* (2013.01); *H02K 15/125* (2013.01); *B29C 39/123* (2013.01); *B29C 39/146* (2013.01); *B29C 39/18* (2013.01); *B29C 2043/188* (2013.01)

(58) Field of Classification Search
CPC ..... B29C 43/265; B29C 43/305; B29C 70/00; B29C 2043/188
USPC ................. 174/137 B, 148; 264/241, 272.13
See application file for complete search history.

(56) References Cited

U.S. PATENT DOCUMENTS

| | | | |
|---|---|---|---|
| 4,906,711 A | 3/1990 | Markovitz | 525/504 |
| 5,158,826 A | 10/1992 | Ihlein et al. | 428/324 |
| 5,244,939 A | 9/1993 | Yasuda et al. | 523/211 |
| 6,395,330 B1 | 5/2002 | Gsellmann et al. | 427/116 |
| 2004/0053061 A1* | 3/2004 | Yonezawa | B32B 15/08 428/458 |
| 2005/0230027 A1* | 10/2005 | Kassa | C08G 18/10 156/79 |
| 2012/0010328 A1 | 1/2012 | Swiatkowski | 523/427 |
| 2015/0101845 A1 | 4/2015 | Gröppel et al. | 174/120 C |

FOREIGN PATENT DOCUMENTS

| | | | | |
|---|---|---|---|---|
| DE | 3824254 A1 | 1/1990 | ........... | C07D 233/61 |
| DE | 19531955 A1 | 3/1997 | ........... | C08G 18/00 |
| DE | 102009012195 A1 | 9/2010 | ........... | C08L 63/02 |
| EP | 0996132 A1 | 4/2000 | ........... | B05D 5/12 |
| RU | 2611050 C2 | 11/2015 | ........... | H01B 3/40 |
| SU | 237973 A1 | 2/1969 | | |
| SU | 240082 A1 | 3/1969 | | |
| WO | 00/24006 A1 | 4/2000 | ........... | B05D 5/12 |
| WO | 2016/146446 A1 | 9/2016 | ........... | C08G 59/50 |

OTHER PUBLICATIONS

International Search Report and Written Opinion, Application No. PCT/EP2016/054998, 19 pages, dated Jun. 8, 2016.
Russian Office Action, Application No. 2017134033/04, 6 pages, dated Jul. 11, 2018.
Chinese Office Action, Application No. 201680016005.0, 16 pages, dated Aug. 20, 2018.

* cited by examiner

INSULATION SYSTEM FOR AN ELECTRICAL MACHINE

CROSS-REFERENCE TO RELATED APPLICATIONS

This application is a U.S. National Stage Application of International Application No. PCT/EP2016/054998 filed Mar. 9, 2016, which designates the United States of America, and claims priority to DE Application No. 10 2015 204 885.3 filed Mar. 18, 2015, the contents of which are hereby incorporated by reference in their entirety.

TECHNICAL FIELD

The present disclosure relates to insulation systems. The teachings thereof may be embodied in an insulation system for an electrical machine.

BACKGROUND

Electrical machines, especially rotating electrical machines, comprise an electrical winding within a lamination stack. This consists of electrical conductors (which may already have been provided with a primary insulation) and solid insulation materials as main insulation. Without any further measures, there is no intimate connection between the lamination stack, the conductors, and the main insulation; the lack gives rise to gaps and cavities. In operation under atmospheric conditions, these regions are typically filled with air. Particularly in the case of applications in the high-voltage sector, this cannot be allowed, since partial electrical discharges would destroy the insulation within a very short time. This leads to failure of the electrical machine.

To bring about an intimate bond and the resulting displacement of air, the winding may be impregnated with a hardenable impregnating resin or impregnating lacquer which is thermally hardened, for example, in an air circulation oven. The solid insulation materials may be installed in porous form to increase the impregnation resin uptake. Examples for this purpose are mica tapes, insulation papers, and/or fleeces.

For the impregnation of machines with nameplate voltages greater than 1 kV, typical insulation systems may be composed of solid insulation materials, impregnating resin consisting of base resin and hardener components, which are used in a vacuum pressure impregnation (VPI) process. Often, acid anhydrides are used for this purpose, which serve as hardener and simultaneously lower the viscosity, the benefit of which is rapid and complete impregnation.

However, mixtures of EP resins and the known hardener components do not harden spontaneously even at elevated temperature, but require a hardening-promoting accelerator or catalyst. Tertiary amines, quaternary onium salts, or zinc naphthenate are catalysts employed, as known from DE3824254A1, DE3003477A1, and/or WO 00/24006.

DE 102014219844.5 discloses an insulation system comprising solid insulation materials and an impregnating resin, wherein the impregnating resin is any reactive resin having oxirane functionalities or a mixture of various reactive resins having oxirane functionalities, and at least one thermally activatable and/or encapsulated hardening catalyst is present in the insulation system.

SUMMARY

Teachings of the present disclosure may be embodied in an insulation system. For example, an insulation system, may comprise solid insulation materials, an impregnating resin having oxirane functionalities, a depot accelerator in the solid insulation materials, and a catalyst for initiating the hardening, wherein the catalyst is at least partly in gaseous form under hardening conditions.

In some embodiments, the hardening mechanism of the impregnation resin follows an ionic polymerization.

In some embodiments, the gaseous catalyst comprises an alkylimidazole.

In some embodiments, the gaseous catalyst comprises a 1,2-dialkylimidazole.

In some embodiments, the gaseous catalyst comprises a mixture of various alkylimidazoles and/or arylimidazoles.

In some embodiments, the gaseous catalyst comprises a mixture of various 1,2-dialkylimidazoles.

In some embodiments, there is at least one additive and/or filler added to the impregnating resin.

In some embodiments, the additive added to the impregnating resin is a reactive diluent.

In some embodiments, the gaseous catalyst is chemisorbable at the surface of the impregnating resin.

In some embodiments, the gaseous catalyst is present bound to a carrier material and/or to an adsorbent such as activated carbon, zeolites and/or metal-organic frameworks.

In some embodiments, the gaseous catalyst is desorbable via a temperature change, the action of radiation and/or a magnetic field.

In some embodiments, the gaseous catalyst is in chemically bound form, for example in ionically bound form and/or bound via hydrogen bonds.

In some embodiments, an insulation system as described above is used for production of an insulation for an electrical machine, a coil, and/or a conductor arrangement.

In some embodiments, an electrical machine, a coil, or a conductor arrangement includes an insulation system as described above.

DETAILED DESCRIPTION

Figure 1:
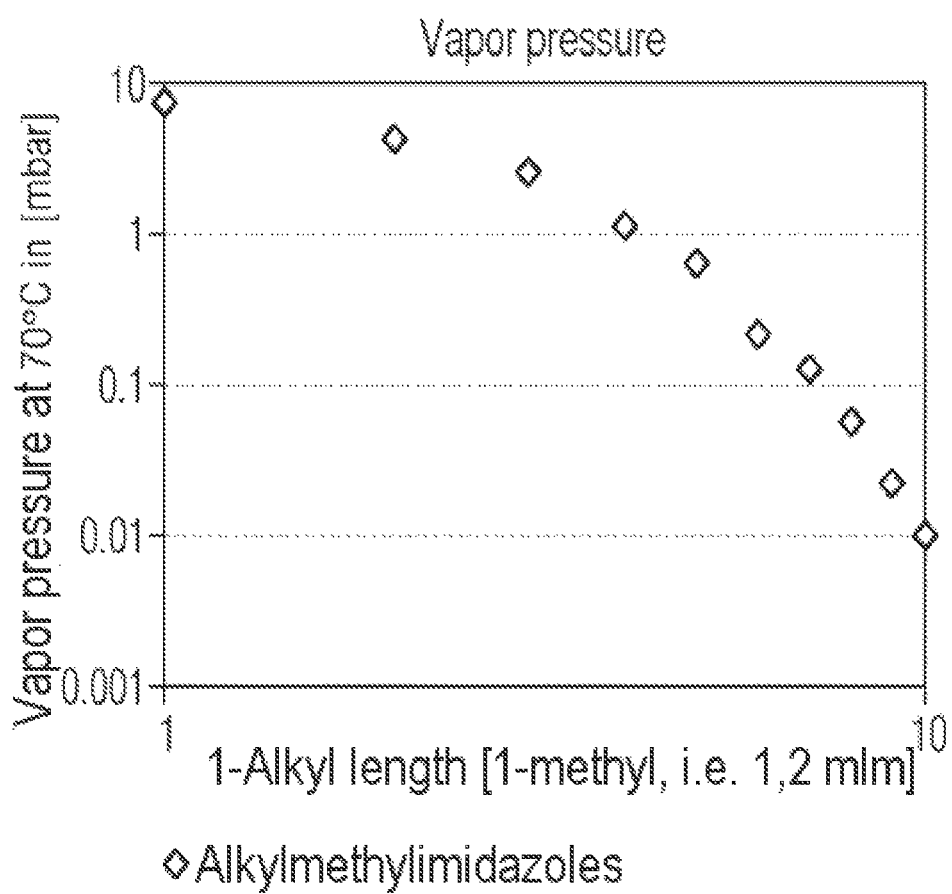
FIG. 1 is a diagram showing the vapor pressure of 1-alkyl-2-methylimidazoles at 70° C. as a function of the 1-alkyl side chain.

The insulation system described herein may comprise an impregnating resin comprising one or more base resins, and one or more hardening catalysts, for example a depot accelerator which is initially charged in the solid porous insulation materials, and another catalyst. In some embodiments, the resin comprises an anhydride-free impregnating resin and a catalyst, and may be embodied in an insulation system with a novel catalyst.

To assure maximum storage stability of the impregnation resin, the hardening catalyst may not be added directly to the commercial impregnating resin but incorporated in the solid porous insulation materials for the main insulation (for example mica tapes). This type of hardening catalyst is called depot accelerator hereinafter. The depot accelerator does not come into contact with the impregnating resin until during the impregnation. In the prior art, given sufficient presence of a depot accelerator, only the portion of the impregnating resin that has been impregnated into the main insulation of the winding comes into contact with the catalyst. However, the portion of the impregnating resin that remains close to the surface has only insufficient contact, if any, with the depot accelerator, which leads to incomplete hardening.

This results in various negative aspects in the insulation system, such as inadequate molding properties to the winding surface, reduced thermal stability, reduced chemical stability, elevated tendency to take up soil owing to a surface which is tacky because it is incompletely hardened. Especially in view of the relatively new impregnating resins having oxirane functionalities that are potentially free of anhydrides in general and of liquid anhydrides in particular, catalyst can be made accessible to the impregnating resin without having any adverse effect either on the storage stability and/or on the impregnating process.

The teachings of the present disclosure may be embodied in an insulation system with a catalyst for an impregnating resin, e.g., one which has oxirane functionalities and is free of liquid acid anhydride, wherein the catalyst is effective in the regions of the insulation system that have no contact with the depot accelerator from the solid insulation materials.

For example, an insulation system may comprise solid insulation materials, an impregnating resin having oxirane functionalities, a depot accelerator in the solid insulation materials, and a catalyst for initiating the hardening, wherein the catalyst is at least partly in gaseous form under hardening conditions. In addition, such an insulation system may be used for production of an insulation for an electrical machine, a coil, and/or a conductor arrangement. Finally, the teachings may be embodied in an electrical machine, a coil, and a conductor arrangement, comprising an insulation system in which an impregnating resin is present together with depot accelerator and catalyst, wherein the catalyst is at least partly in gaseous form under hardening conditions.

The impregnating conditions correspond, for example, to the conditions under which vacuum pressure impregnation (VPI) is conducted. To contact the impregnating resin-wetted surfaces substantially completely with the catalyst after the impregnation of the solid insulation materials, the use of a catalyst or accelerator which is gaseous under hardening conditions may be employed. This is possible, for example, via convection and/or diffusion processes to the resin surface and initiates the hardening reaction there. Important factors for the functionality and depth efficacy of this initiation of hardening via the gas phase may include the vapor pressure of the accelerator, the activation temperature thereof, and the underlying reaction mechanism.

In some embodiments, the impregnating resin includes oxirane functionalities and the gaseous catalyst is chemisorbed at the surface. In some embodiments, the gaseous catalyst is bound to a carrier material and can be released through an increase in temperature.

In some embodiments, at least one compound in the form of an alkylimidazole and/or an aryl-imidazole is present in the gaseous catalyst. The catalyst may also comprise a mixture of two or more alkylimidazoles, e.g., 1,2-dialkylimidazoles.

In some embodiments, the impregnating resin is present in the insulation system together with a reactive diluent, for example propylene carbonate. The reactive diluent may lower the viscosity of the impregnating resin, so the solid insulation materials are wetted rapidly and adequately during the impregnation.

Figure 2:
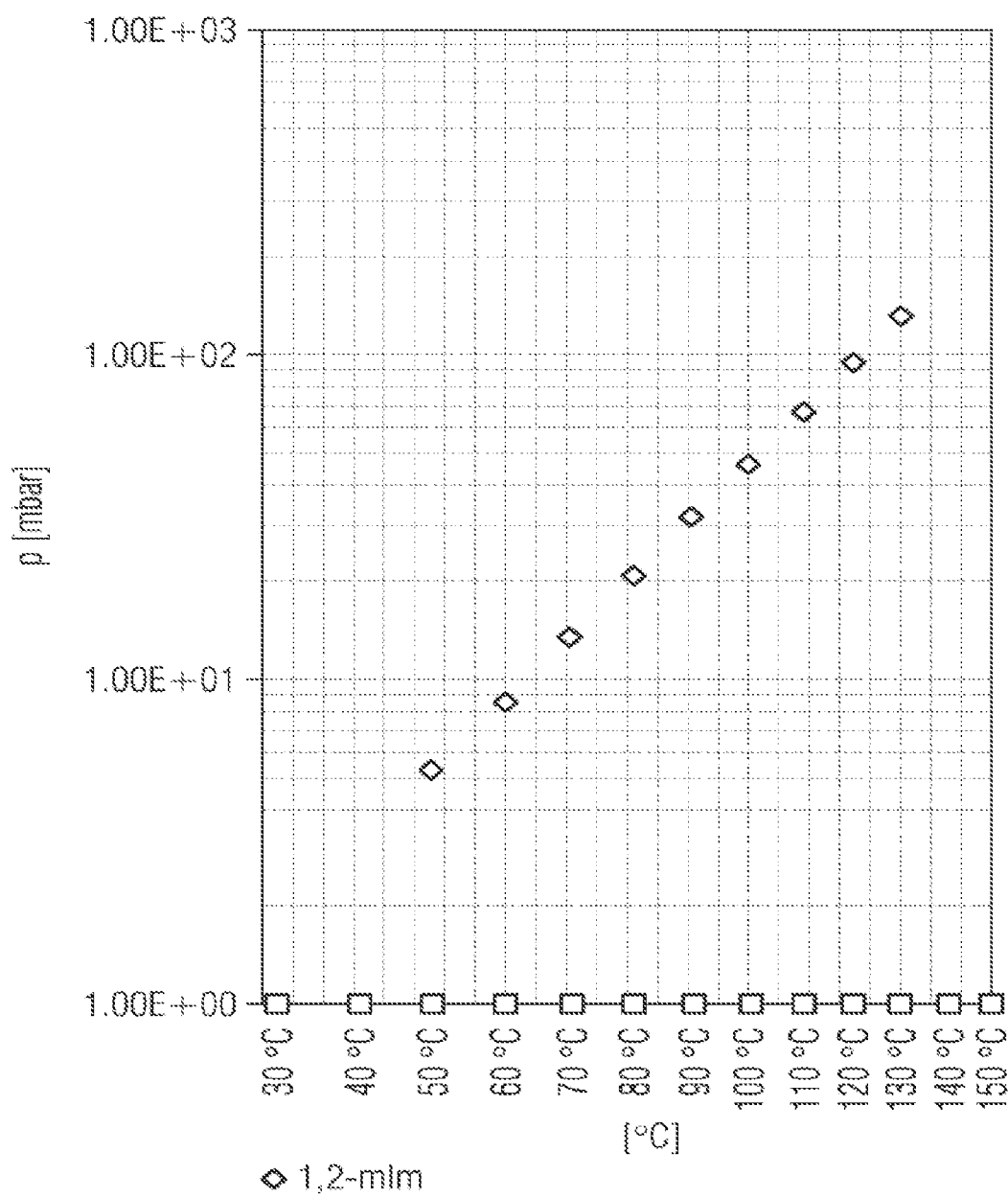
FIG. 2 is a diagram showing the vapor pressure of 1,2-dimethylimidazole as a function of temperature.

In some embodiments, the alkylimidazoles may control the vapor pressure of the alkylimidazoles by derivatization of the side chain. This is shown by FIG. 1, in which the vapor pressure of the 1-alkyl-2-methylimidazoles at 70° C. is shown as a function of the 1-alkyl side chain. FIG. 2 shows the vapor pressure of 1,2-dimethylimidazole as a function of temperature.

Via variation of the side chain, it is possible to control the electron density in the imidazole ring, which is responsible for the reactivity of the imidazoles. For example, it is possible via an alkyl chain in the 2 position of the ring to increase the reactivity by means of the +I effect. It is thus possible to match the vapor pressure and the reactivity to the intended hardening conditions and the impregnating resin used. If necessary, this can also be refined further by means of a mixture of different imidazoles. In some embodiments, there is initial charging of the imidazoles in inert solvents having suitable vapor pressures as an evaporation aid.

In addition, some embodiments include the binding of the alkylimidazoles to adsorbents and/or carrier materials such as activated carbon, zeolites, metal-organic frameworks (MOF), and/or polymeric adsorbents. For example, it is possible to release the alkylimidazoles (again) by the action of temperature. It is likewise possible to prepare the alkylimidazoles "in situ" by a chemical reaction and release them.

Figure 3:
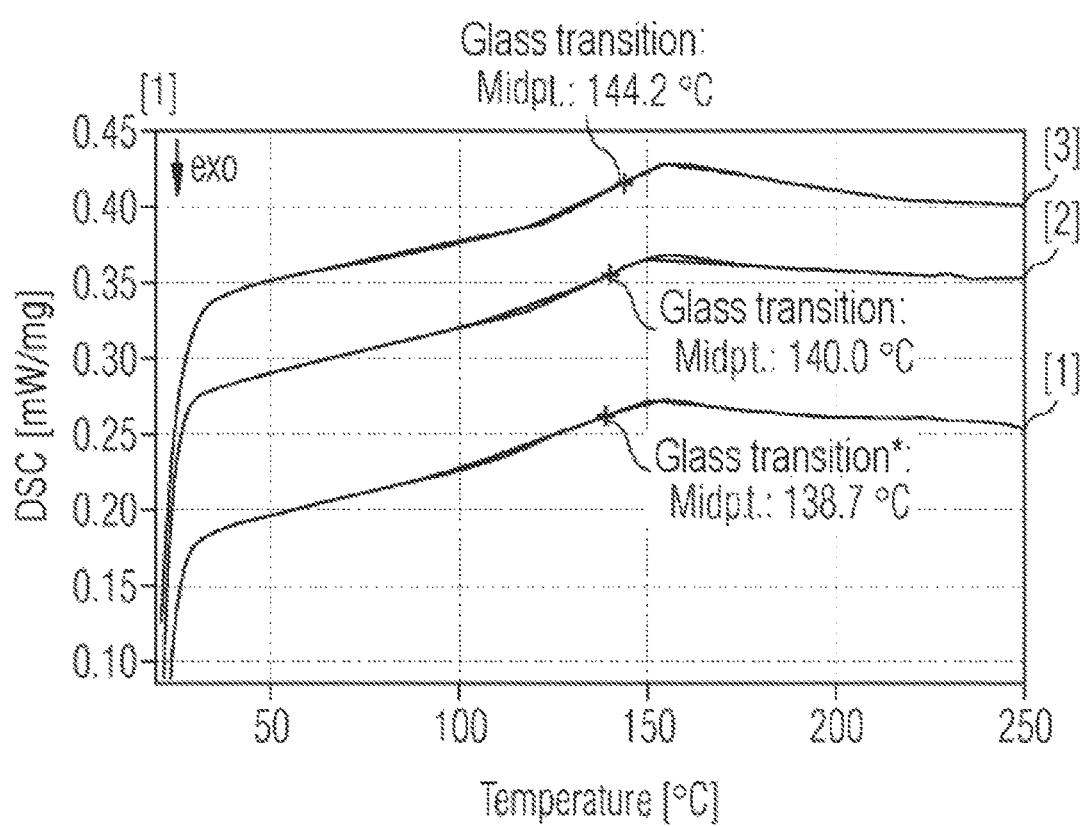
FIG. 3 is a diagram showing the glass transition temperatures of a mixture of bisphenol F diglycidyl ether with one percent propylene carbonate, red in a 1,2-dimethylimidazole-containing atmosphere.

In some embodiments, a mixture of a low-viscosity bisphenol F diglycidyl ether with one percent propylene carbonate is hardened in a staged hardening process from 70° C. to 145° C. by means of a 1,2-dimethylimidazole-containing atmosphere. Here, depending on the concentration of 1,2-dimethylimidazole in the atmosphere, glass transition temperatures of 135 to 145° C. are possible. FIG. 3 shows a corresponding graph of the glass transition temperatures of a mixture of bisphenol F diglycidyl ether with one percent propylene carbonate, red in a 1,2-dimethylimidazole-containing atmosphere. Vapor pressure and reactivity of the catalyst may be selected based on alkylimidazole, especially through variation of the side chains of the alkylimidazoles, for adaptation to impregnating resin and process conditions.

In some embodiments, an anhydride-free impregnating resin is used with a depot accelerator, the hardening mechanism of which follows the anionic or cationic polymerization. In that case, it is possible by means of a surface treatment of the impregnating resin with gaseous catalyst also to initiate hardening in the regions in which the depot accelerator is insufficiently active. By means of a hardening reaction effected by ionic polymerization, the addition of a gaseous catalyst can also develop a depth effect which also reaches folds and pockets in the solid insulation materials of the winding.

In some embodiments, the impregnating resin is an epoxy resin. For example, the epoxy resin may comprise one or more compounds selected from the group of the following compounds: undistilled and/or distilled, optionally reactively diluted bisphenol A diglycidyl ether, undistilled and/or distilled, optionally reactively diluted bisphenol F diglycidyl ether, hydrogenated bisphenol A diglycidyl ether and/or hydrogenated bisphenol F diglycidyl ether, pure and/or solvent-thinned epoxy novolak and/or epoxy-phenol novolak, cycloaliphatic epoxy resins such as 3,4-epoxycyclohexylmethyl 3,4-epoxycyclohexyl-carboxylate, e.g. CY179, ERL-4221; Celloxide 2021P, bis(3,4-epoxycyclohexylmethyl) adipate, e.g. ERL-4299; Celloxide 2081, vinylcyclohexene diepoxide, e.g. ERL-4206; Celloxide 2000, 2-(3,4-epoxycyclohexyl-5,5-spiro-3,4-epoxy)cyclohexane-meta-dioxane, e.g. ERL-4234; diglycidyl hexahydrophthalate, e.g. CY184, EPalloy 5200; tetrahydrophthalic acid diglycidyl ether, e.g. CY192; glycidized amino resins (N,N-diglycidyl-para-glycidyloxyaniline, e.g. MY0500, MY0510, N,N-diglycidyl-meta-glycidyloxyaniline, e.g. MY0600, MY0610, N,N,N',N'-tetraglycidyl-4,4'-methylenedianiline, e.g. MY720, MY721, MY725, and any desired mixtures of the aforementioned compounds.

In some embodiments, the impregnating resin comprises at least one additive and/or at least one filler. In some embodiments, the anhydride-free impregnating resin is in a form in which the gaseous accelerator can be chemisorbed at the surface. In some embodiments, it is possible to bind the alkylimidazoles to adsorbents and/or carrier materials such as activated carbon, zeolites, metal-organic frameworks (MOF) and/or polymeric adsorbents, in which case release is possible, for example, through an increase in temperature.

In some embodiments, a further hardening catalyst is available to an acid anhydride-free impregnating resin in addition to the depot accelerator, without directly mixing it with the impregnating resin. This enables adequate hardening of the impregnating resin in the surfaces and near-surface regions as well, without having any adverse effects on the storage stability of the impregnating resin.

In some embodiments, these teachings may reduce or avoid disadvantages such as inadequate molding properties to the winding surface, reduced thermal stability, reduced chemical stability, and/or elevated tendency to take up soil owing to a surface which is tacky because it is incompletely hardened.

Some embodiments may include an insulation system for an electrical machine, comprising an impregnating resin and a catalyst, and uses thereof, especially an insulation system comprising novel catalyst. The use of a further hardening catalyst available to an acid anhydride-free impregnating resin in addition to the depot accelerator, without directly mixing it with the impregnating resin may enable adequate hardening of the impregnating resin in the surfaces and near-surface regions as well, without having any adverse effects on the storage stability of the impregnating resin.

What is claimed is:

1. An insulation system, comprising:
   porous solid insulation materials;
   an impregnating resin distributed throughout the porous solid insulation materials, the impregnating resin having oxirane functionalities;
   a depot accelerator distributed throughout the porous solid insulation materials and physically separate from the impregnating resin until an impregnating process is performed; and
   a catalyst for initiating hardening of the impregnating resin, wherein the catalyst is distinct from the depot accelerator and provided in a gaseous form to external surfaces of the insulation materials including the impregnating resin to promote hardening in regions proximate the external surfaces of the insulation materials.

2. The insulation system as claimed in claim 1, wherein a hardening mechanism of the impregnating resin includes an ionic polymerization.

3. The insulation system as claimed in claim 1, wherein the catalyst comprises an alkylimidazole.

4. The insulation system as claimed in claim 1, wherein the catalyst comprises a 1,2-dialkylimidazole.

5. The insulation system as claimed in claim 1, wherein the catalyst comprises a mixture of constituents chosen from the group consisting of alkylimidazoles and arylimidazoles.

6. The insulation system as claimed in claim 1, wherein the catalyst comprises a mixture of 1,2-dialkylimidazoles.

7. The insulation system as claimed in claim 1, further comprising an additive or filler added to the impregnating resin.

8. The insulation system as claimed in claim 1, further comprising a reactive diluent added to the impregnating resin.

9. The insulation system as claimed in claim 1, wherein the gaseous catalyst is chemisorbable at the surface of the impregnating resin.

10. The insulation system as claimed in claim 1, wherein the gaseous catalyst is present bound to a carrier material or an adsorbent.

11. The insulation system as claimed in claim 10, wherein the gaseous catalyst is desorbable via a temperature change, the action of radiation, or a magnetic field.

12. The insulation system as claimed in claim 1, wherein the gaseous catalyst is in chemically bound form.

* * * * *